(12) United States Patent
Chalk et al.

(10) Patent No.: US 7,168,446 B2
(45) Date of Patent: Jan. 30, 2007

(54) HIGH IMPACT DISCHARGE VALVE

(75) Inventors: David Jonathan Chalk, Slatington, PA (US); Thomas T. Hand, Andreas, PA (US); David John Farese, Riegelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 83 days.

(21) Appl. No.: 11/128,516

(22) Filed: May 13, 2005

(65) Prior Publication Data

US 2006/0260693 A1    Nov. 23, 2006

(51) Int. Cl.
*F16K 21/10* (2006.01)
*F16K 15/02* (2006.01)

(52) U.S. Cl. .......... 137/514; 137/514.5; 137/540; 137/904; 251/64; 251/284; 251/337

(58) Field of Classification Search .......... 137/514, 137/514.5, 514.7, 540, 904; 251/64, 284, 251/337; 417/569, 570, 901
See application file for complete search history.

(56) References Cited

U.S. PATENT DOCUMENTS

| 1,963,684 | A | * | 6/1934 | Shimer | 137/329.04 |
| 4,340,085 | A | * | 7/1982 | Crawford et al. | 137/514 |
| 4,447,195 | A |   | 5/1984 | Schuck | |
| 4,559,786 | A |   | 12/1985 | Schuck | |
| 4,967,790 | A |   | 11/1990 | Ganske | |
| 5,240,036 | A | * | 8/1993 | Morris | 137/514.7 |
| 5,746,246 | A | * | 5/1998 | Yokota et al. | 137/514 |

* cited by examiner

*Primary Examiner*—Ramesh Krishnamurthy
(74) *Attorney, Agent, or Firm*—Keith D. Gourley

(57) ABSTRACT

A check valve for use in a pump. The valve is arranged to be subjected to severe service conditions and high impact loads, yet be resistant to damage to its components. The check includes a body, a valve seat, a poppet and an impact cushion. The poppet is movably coupled to the valve seat and is biased by a spring into engagement with the valve seat. Upon the opening of the valve the poppet moves off of the valve seat and into engagement with the impact cushion against the spring bias. The impact cushion is movably coupled to the valve body and is biased by another spring. When the poppet engages the impact cushion they stay together and move, with the movement of the impact cushion absorbing energy from the poppet.

17 Claims, 4 Drawing Sheets

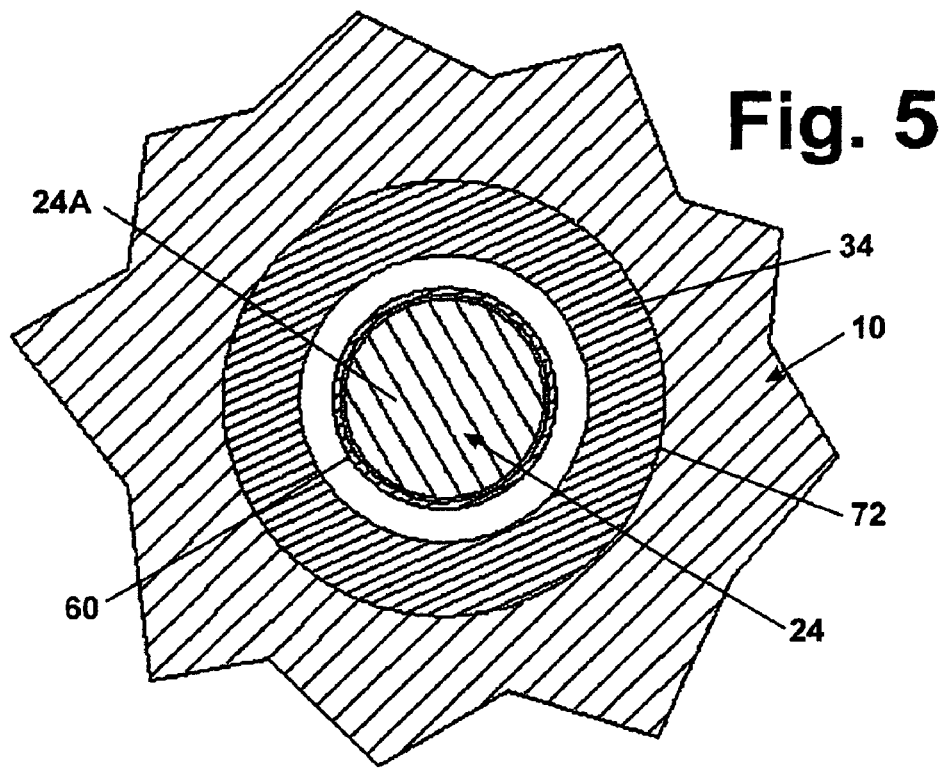
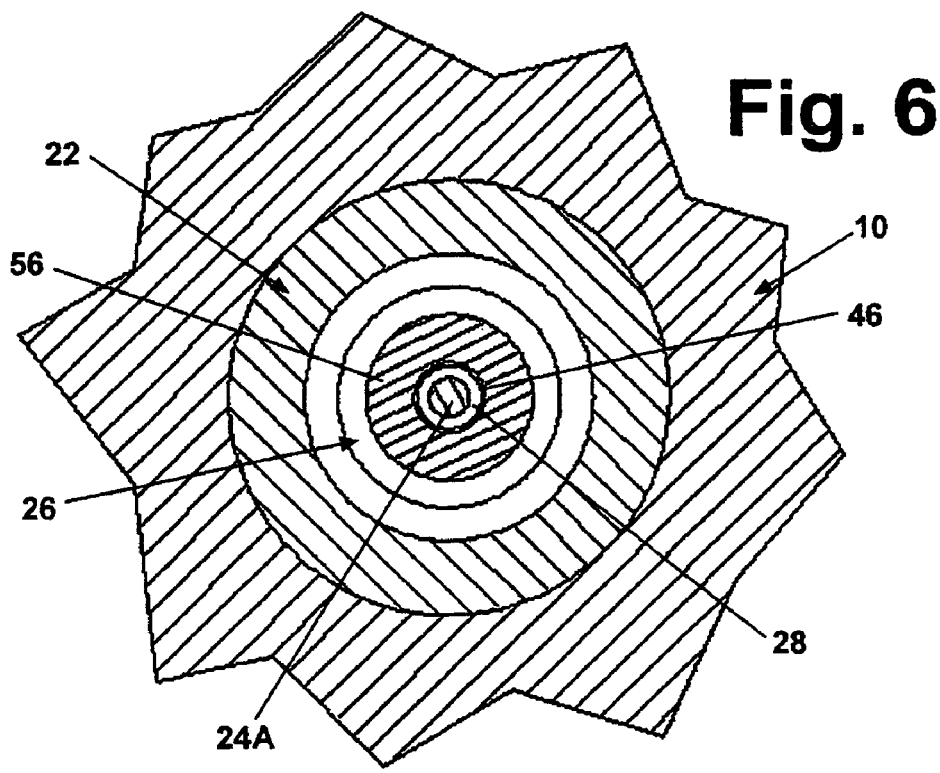

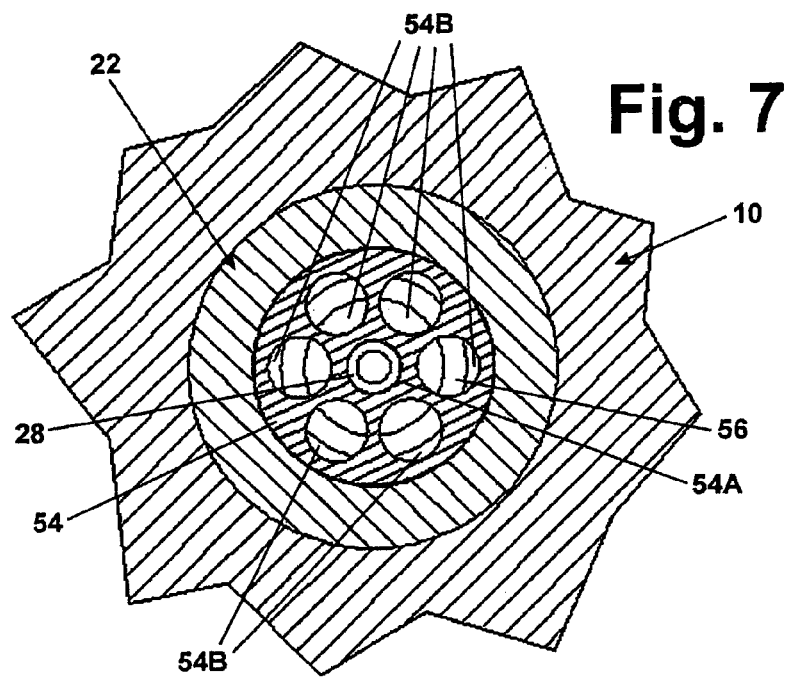
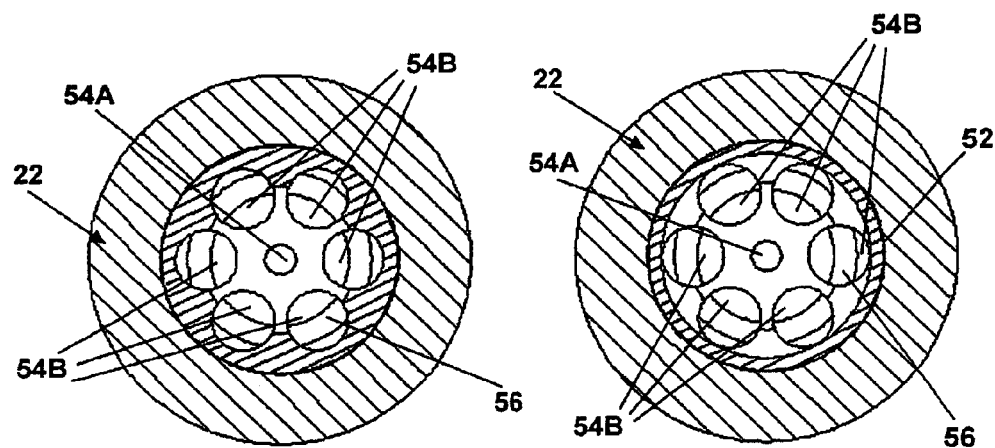

HIGH IMPACT DISCHARGE VALVE

BACKGROUND OF THE INVENTION

This invention relates generally to valves and more particularly to check valves for severe service applications where high impact loads would be expected.

As is known, normally, when a check valve is subject to rapid (dynamic) changes in flow (direction or magnitude) its moving parts acquire kinetic energy. If the flow increases in magnitude the direction of motion of the poppet will be called opening. If the flow decreases in magnitude or reverses, the poppet's direction of motion will be called closing. During periods of steady flow the poppet will (eventually) acquire an equilibrium position where, in the absence of other effects, the fluid resistance forces against its face are balanced by the forces exerted by the valve body and/or the spring. Check valves used in reciprocating pumps and compressors (both for the inlet and discharge of each cylinder) are subjected to dynamic flow within each cycle. Therefore, the poppet element is in motion during at least part of each cycle. The accelerations and velocities of the poppet are not negligible. Unless the dimensions of the valve are sufficient to provide no limit to the poppet motion, the poppet will, when opening strike a stop of the valve. When closing, the poppet will eventually strike the valve seat. The problem is that when the poppet strikes either the stop or the valve seat it may rebound, and will generally produce forces and stresses on the seat, stop and faces of the poppet. Rebounds from the seat result in a lag between the time at which the valve should close and the time at which the poppet comes to rest in the closed position. This delay results in reverse flow in the reciprocating compression equipment. Should the impact stresses induced in the seat stop, or the poppet be of sufficient magnitude, yielding, deformation and finally fracture of the valve component can result.

In U.S. Pat. No. 4,447,195 (Schuck) and U.S. Pat. No. 4,559,786 (Schuck), both of which are assigned to the same assignee as this invention, there is disclosed a pump for compressing a low temperature high density liquid gas, e.g. liquid helium. The pump includes a discharge valve having a movable poppet and making use of plural elastic cushion elements. These elements are provided to cushion the impact forces extant during the cyclical opening and closing of the valve.

In U.S. Pat. No. 4,967,790 (Ganske) there is disclosed a gravity closed swing check valve which is designed to exhibit resistance to impact damage. To that end the valve includes a clapper which is arranged to engage a downstream surface that is semi-spherical and convex. The body of the valve forms a concave semi-spherical cavity. The radii of the clapper and cavity surfaces is the same. The clapper is positioned so that its downstream surface bears evenly across the surface of the body cavity, when the clapper is in the fully open position. Thus the cavity surface of the body acts as a stop for the clapper and the area of stop surface is relatively large.

While the aforementioned prior art valves may be suitable for their intended purposes they nevertheless leave something to be desired from one or more of the standpoints of resistance to impact force induced damage, reliability, complexity, cost. In addition, due to scaling factors, the impact stresses increase as overall valve size increases. Because of this, larger pump valves face increased stresses and are prone to damage as compared to smaller valves.

SUMMARY OF THE INVENTION

In accordance with one aspect of this invention a check valve for use in a pump or other device subjected to severe service conditions and high impact loads is provided. The check valve comprises a valve body, a valve seat, a poppet and an impact cushion. The valve seat is coupled to a port at which a pressurized fluid may be introduced.

The poppet is movably coupled to said valve seat and biased (e.g., biased by a spring) to normally engage the valve seat while being arranged to move off of the valve seat and into engagement with the impact cushion against the bias. The impact cushion is movably coupled to the valve body and biased (e.g., biased by another spring), whereupon when the poppet moves into engagement with the impact cushion the impact cushion and the poppet stay together and the impact cushion moves with respect to the valve body after absorbing energy from the poppet. Note that for an inelastic collision, the coefficient of restitution is zero and kinetic energy is not conserved, but is absorbed by the parts involved in the collision and converted to heat and noise.

DESCRIPTION OF THE DRAWING

FIG. 5 is a sectional view taken along lines 5—5 of FIG. 1;

FIG. 6 is a sectional view taken along lines 6—6 of FIG. 1;

FIG. 7 is a sectional view taken along lines 7—7 of FIG. 1;

FIG. 8 is a sectional view taken along lines 8—8 of FIG. 1; and

FIG. 9 is a sectional view taken along lines 9—9 of FIG. 1.

DETAILED DESCRIPTION OF THE PREFERRED EMBODIMENT

Figure 1:
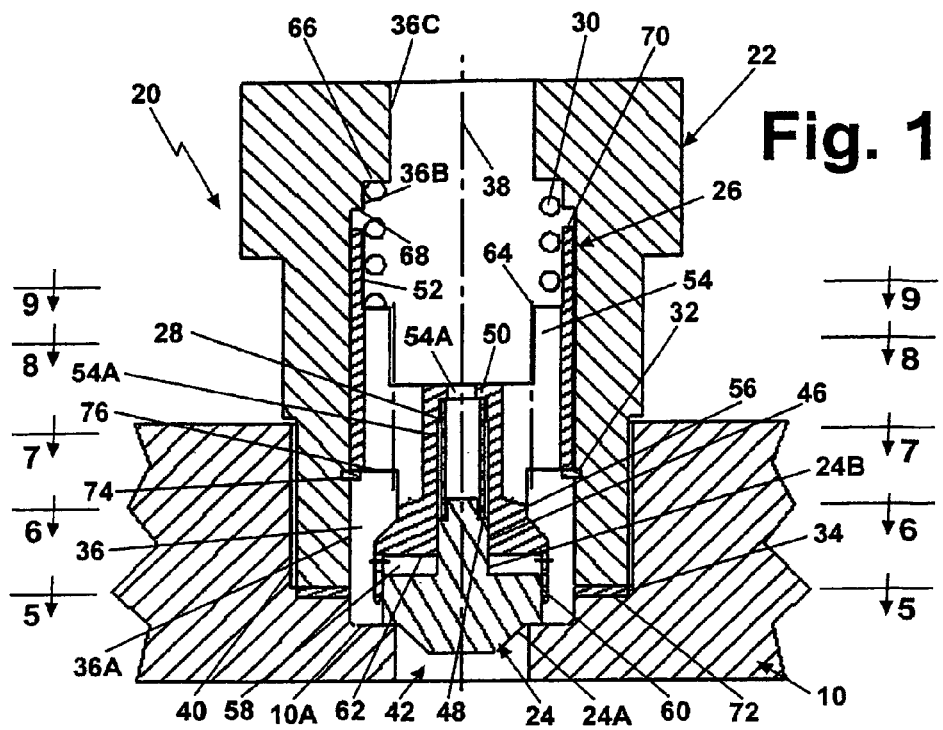
FIG. 1 is a vertical longitudinal sectional view of one exemplary embodiment of a high impact check valve constructed in accordance with this invention and shown in its normally closed condition.

Referring now to the various figures of the drawing wherein like reference numbers refer to like parts, there is shown one exemplary embodiment of a high impact discharge or check valve 20 constructed in accordance with this invention. As will be described in considerable detail later, the exemplary valve 20, like other check valves constructed in accordance with this invention, comprises an impact cushion and a poppet. The impact cushion and poppet material are selected such that the coefficient of restitution between them is zero so that following a collision between the two, the two stay together to reduce the impact forces on the valve's components.

The valve 20 is arranged to be mounted on a body portion 10 of a pump or other component forming a portion of a system (not shown) for delivering cryogenic or other two phase fluids. Being in that environment, the valve 20 is subject to high duty cycles, e.g., opening and closing 500 times per minute or more, and high impact forces, which can be extremely abusive to the valve's components. In particular, a valve of this invention may be called upon to go from a fully closed to a fully open position in approximately 0.002–0.005 seconds. The valve allows fluid to pass through it and then must move from the fully open to fully closed position in a similarly short period of time. The result of such action on prior art valves is extreme wear and tear on their components due to sliding wear and impact loads. The valve 20 of the subject invention exhibits reduced wear on its components, while minimizing impact loads. By so doing, larger valve poppets can be used, and valves become more reliable.

The exemplary embodiment of the valve 20 shown in FIG. 1 basically comprises a valve body 22, a poppet 24, an impact cushion 26, a discharge valve spring 28, an impact cushion spring 30, a retaining ring 32 and a gasket 34. The valve 20 is mounted on a body portion 10 of the pump so that the poppet 24 normally closes an inlet orifice (to be described later) having a circumscribing valve seat 10A. The valve body 22 basically comprises a cylindrical jacket through which a cylindrical bore 36 extends. The bore 36 extends centered along the longitudinal axis 38 of the valve 20 and includes several sequentially located sections 36A, 36B and 36C, of differing diameters. The valve body or jacket 22 is arranged to be located within a bore 40 in the pump body 10 so that the proximal end portion of the poppet is located adjacent the valve seat 10A. The valve seat 10A surrounds the inlet aperture or port 42. It is via this port that any desired fluid to be handled by the valve and pump is introduced.

The poppet 24 basically comprises a cylindrical member having a proximally located head section 24A and a distally located tail section 24B. The proximal end of the head section includes an annular planar ledge 44 (FIG. 2) whose outside diameter is larger than the inside diameter of the valve seat 10A. The poppet is arranged to reciprocated along the longitudinal central axis 38 of the valve 20. In particular, the poppet is movable from a "closed" position shown in FIG. 1, wherein the annular planar ledge or sealing surface 44 engages the periphery of the valve seat 10A to isolate the port 42 from the interior of the valve 20, to an "open" position shown in FIG. 3, wherein the poppet 24 is located the furthest distance from the valve seat 10A, so that the valve 20 is at it maximum open position, and vice versa.

The tail section 24B of the poppet 24 is of cylindrical shape and is of smaller outside diameter than the diameter of the poppet's head section 24A. The tail section 24B is arranged to be located within a portion of a bore 46 extending longitudinally through the impact cushion 26. The bore 46 guides the reciprocating movement of the poppet 24. The discharge valve spring 28 is arranged to normally bias the poppet 24 so that the poppet's sealing surface 44 is in engagement with the valve seat 10A, i.e., the valve is closed. Any suitable spring can be used for this purpose. In the exemplary embodiment shown herein the discharge valve spring 28 is a helical compression spring. The spring 28 is located within the bore 46 of the impact cushion 26, with its proximal end engaging and bearing on an annular ledge 48 at the distal end portion of the poppet tail section 24B. The distal end of the spring 28 engages and bears on an annular flange 50 at the distal end of the bore 48.

The impact cushion 26 basically comprises a generally cylindrically shaped body having a distally located side wall section 52, an intermediate section 54 and a proximally located head section 56. The head section 56 includes a centrally located cavity 58 at its proximal end, with the cavity being surrounded by a circular side wall 60. The impact cushion 26 is preferably constructed as an integral unit of a suitable shock absorbing material, e.g., a plastic. One particularly effective plastic material is glass filled polytetrafluoroethylene. A centrally located cylindrical bore 54A extends longitudinally through the intermediate section 54 of the impact cushion from the bottom surface 62 of the cavity 58. The inside diameter of the bore 54A is just slightly larger than the outside diameter of the tail section 24B of the poppet 24. As best seen in FIG. 7, a plurality of longitudinally extending passageways 54B are located within the intermediate section 54 of the impact cushion 26 equidistantly spaced about the central bore 54A. These passageways terminate at their proximal ends in openings that are in communication with the bore 36 in the valve body 22 so that the fluid can flow therethrough when the valve is open (as will be described later).

Figure 3:
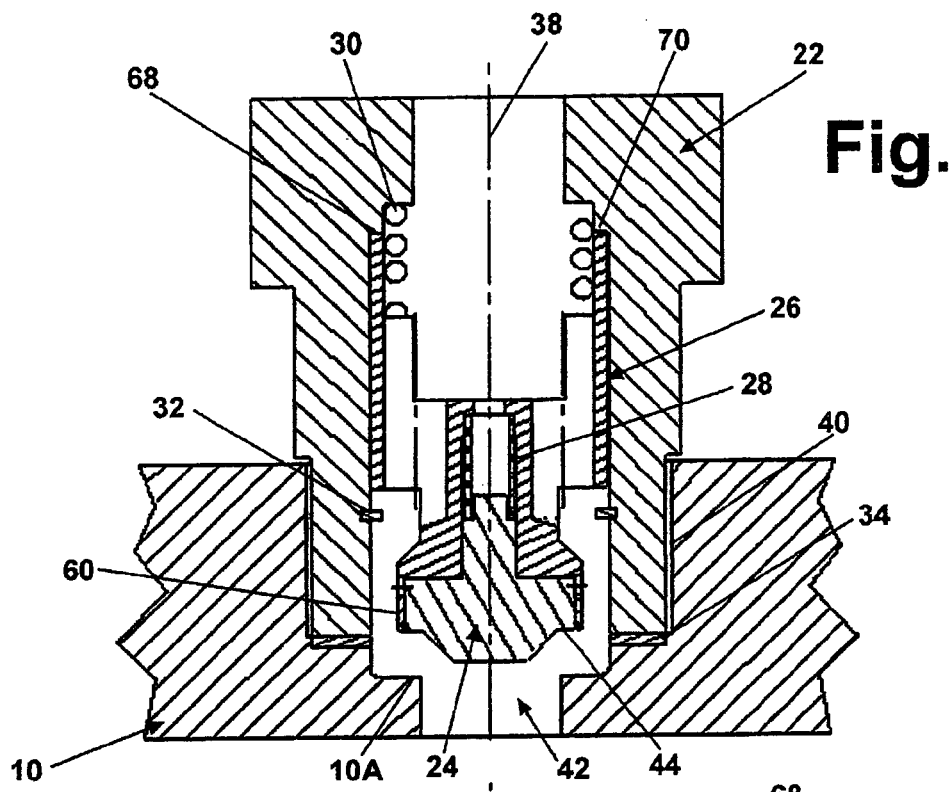
FIG. 3 is a view similar to FIGS. 1 and 2 but showing the valve in its fully open condition.

The impact cushion spring 30 is arranged to normally bias the impact cushion 26 so that its head section 56 is located disposed closest to the valve seat 10A, such as when the valve is closed as shown in FIG. 1. Any suitable spring can be used for this purpose. In the exemplary embodiment shown the impact cushion spring 30 is a relatively heavy helical compression spring. The spring is located within the bore section 36B of the valve body or jacket 22, with its proximal end engaging and bearing on an annular ledge 64 at the distal end portion of the impact cushion 26. The distal end of the impact cushion spring 30 engages and bears on an annular ledge 66 at the interface of the bore sections 36B and 36C. The distally located section 36C of the bore 36 in the valve body 22 forms the outlet port of the valve 20 and is the port through which the fluid introduced into the valve exits the valve. The interface of the bore sections 36A and 36B form a stop surface or ledge 68 against which the distal end surface 70 of the impact cushion 36 bears when the valve 20 is at its maximum open position as shown in FIG. 3.

As best seen in FIGS. 1 and 5, the gasket 34 is an annular ring-like member of any suitable material which is provided to prevent the egress of fluid at the interface of the valve body 22 and the body portion 10 of the pump or other component in which the valve 20 is mounted. To that end an annular ledge 72 is located in the bore 40 in the body portion of the pump on which the gasket 34 is seated.

The impact cushion 36 is held in place in the bore 36 of the valve body 22 by means of the retaining ring 32. The retaining ring 32 is located and held within a correspondingly shaped recess 74 in the valve body 22 at an intermediate position in the bore section 36A. When so mounted, an inner peripheral portion of the retaining ring extends into the bore section 36A to bear against an annular ledge portion 76 of the impact cushion 36. This action traps the impact cushion spring 30 in place and enables that spring to bias the impact cushion 26 towards the valve seat 10A.

As will be appreciated by those skilled in the art from the discussion to follow, the valve 20 relies on two phenomena to minimize stresses in its component parts. One of those phenomena is the fact that energy is absorbed during impact between two objects during an inelastic collision. In particular, during collision of one object with another, if the two objects stick or stay together, momentum is conserved. Kinetic energy, on the other hand, is not conserved, but dissipates in the form of heat, noise, and other phenomena. The other phenomenon upon which the valve 20 relies is the acceleration forces over the course of the poppet's travel. In this regard, when the valve 20 is closed and pressure begins to build in the pump (or any other component, e.g., compressor cylinder, etc.) in which the valve 20 is mounted, the forces causing the poppet to accelerate are the highest. These forces diminish as the valve continues to open.

Figure 2:
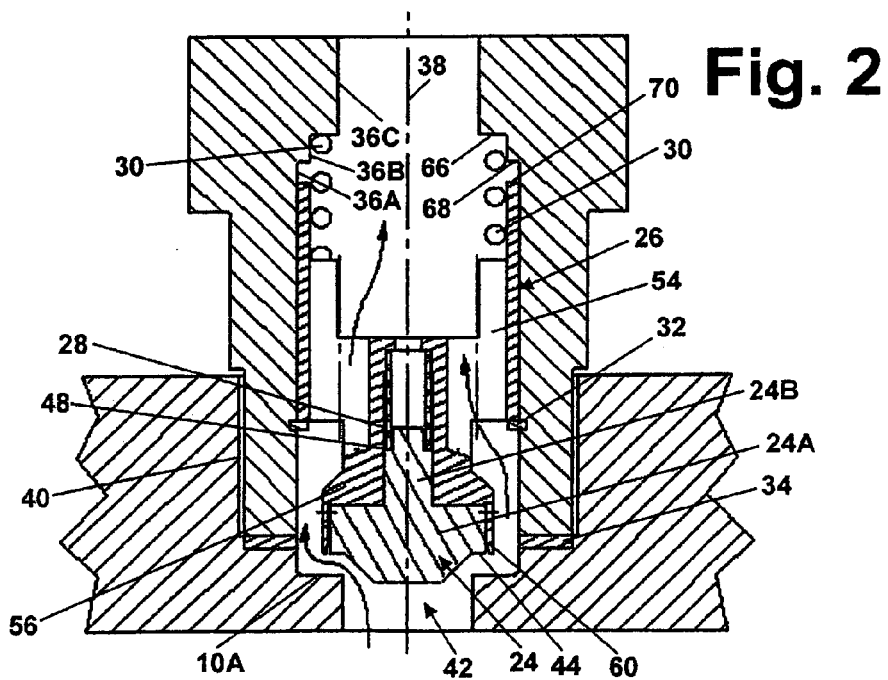
FIG. 2 is a view similar to FIG. 1, but showing the valve in a partially open condition.

The valve 20 relies on this set of phenomena to minimize stresses in the parts. In particular, the valve starts out closed as shown in FIG. 1. As the fluid pressure upstream at the inlet port reaches a threshold value that over comes the load provided by the valve spring 28, the valve spring starts to compress and the poppet 24 begins to opens, i.e., the sealing surface 44 lifts off of the valve seat 10A and the poppet moves in the distal (upward direction) as shown in FIG. 2. When this occurs the fluid is enabled to flow from the inlet port 42 through the space between the valve seat 10A and the sealing surface 44 of the poppet 24 as shown by the arrows in FIG. 2. The fluid then enters the passageways 54B in the impact cushion 26 and flows through them and out through the bore sections 36A, 36B and 36C of the valve body 22. Continued movement in the distal direction causes the head 24A of the poppet 24 to engage (rapidly impact) the surface 64 of the cavity 58 in the impact cushion 26. The impact cushion 26 is biased (held in a downward or proximal direction) by the impact cushion spring 30. When the poppet 24 first contacts the impact cushion 26, there is some change in velocity in the poppet as the impact cushion compresses slightly. Moreover, when the poppet impacts the impact cushion they effectively stick or stay together, whereupon the kinetic energy created by the accelerating poppet is partially dissipated (the poppet and impact cushion stay in contact after impact). The force of the initial impact is transmitted through the impact cushion 26 to the impact cushion spring 30. This force overcomes the bias force provided by that spring, whereupon the impact cushion 26 itself begins to move, i.e., it accelerates abruptly (rises upwards in the distal direction) until it has moved to the position at which its surface 70 impacts the stop surface 68 of the valve body 22. The energy absorbed during the first impact results in stresses induced in the poppet and impact cushion roughly equal to the stresses induced as the impact cushion/poppet combination impacts the stop surface 68 of the valve body 22. When the combination impact cushion/poppet thus impacts the solid valve body, all motion stops, and residual energy must be dissipated by all parts. This creates stresses in all of the valve parts, primarily compressive stress. Thus, by having separate and smaller impact loads, the materials are better able to handle the stresses involved.

It should be noted that as the poppet opens, the flow area increases, such that at some point, the flow area through the inlet port 42 is equal to, or smaller than the flow area around the valve seat 10A. As the poppet continues to rise (move distally), the pressure difference across the poppet drops, and the forces causing the valve to open also drop. As this happens, the impact cushion spring 30 is slowing the combination of the poppet and impact cushion to minimize the final impact stresses. In particular, as the poppet and impact cushion continue to move upward together and before the impact cushion's surface 70 engages the stop surface 68, the heavy bias force provided by the impact cushion spring 30 slows the valve's opening and continues to absorb kinetic energy of the poppet/impact cushion combination. The driving force is lower at the end of the poppet travel due to the high valve opening, which minimizes the pressure drop across the poppet. The velocity of the poppet/impact cushion moving together declines during this portion of the opening and any remaining kinetic energy is absorbed when the impact cushion impacts the stop surface 70 of the valve body 22.

Figure 4:
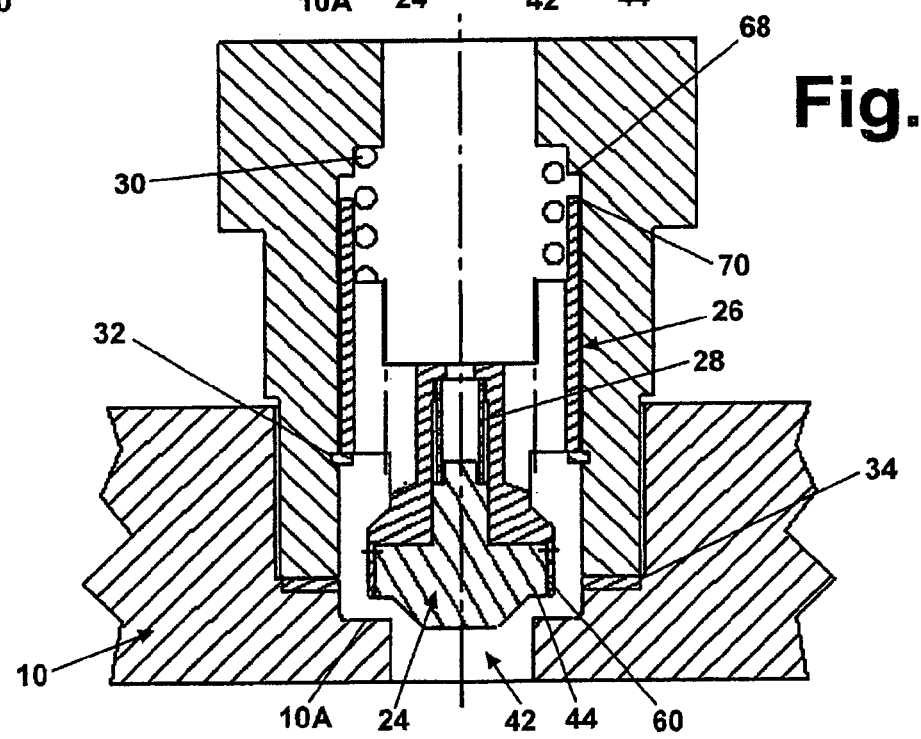
FIG. 4 is a view similar to FIGS. 1–3 but showing the valve in its partially closed condition.

The poppet begins to close, i.e., it and the cushion move proximally or downward together as shown in FIG. 4, as the fluid flow declines and the opening force drops. The poppet and impact cushion combination stops moving proximally when the surface 76 of the impact cushion 26 comes into contact with the retainer 32. When the flow drops to zero the bias force provided by the discharge valve spring 28 pushes the poppet head 24A out of the cavity 58 until the poppet head's sealing surface 44 engages the valve seat 10A, whereupon the valve closes.

As should be appreciated by those skilled in the art, the subject invention provides a valve which can be subject to rapidly repetitive high impact loads, yet which will be resistant to damage of its components by virtue of its energy absorption/dissipation properties. Moreover, with the subject invention at low valve lift, the pressure differential is high and the valve opening force is high. Spring-load is low, thereby allowing quick opening of the valve.

It should be pointed out at this juncture that the valve 20 shown and described above is merely one exemplary valve of numerous configurations that can be made in accordance with this invention. Moreover, the materials used for making up the valve components will depend on stresses, weight, chemical compatibility, and other factors. Nevertheless, assuming a metal valve body is used, one particularly effective material for use as an impact cushion is typically a bearing grade of plastic, such as glass filled Teflon® (polytetrafluoroethylene). The reason for this is that this piece slides inside a metal body, such that wear is minimized using such a material. The poppet itself can be made of any suitable material.

While the invention has been described in detail and with reference to specific examples thereof, it will be apparent to one skilled in the art that various changes and modifications can be made therein without departing from the spirit and scope thereof.

We claim:

1. A check valve for use in a pump subjected to severe service conditions and high impact loads, said valve comprising: a valve body, a valve seat, a poppet and an impact cushion; said valve seat being coupled to a port at which a pressurized fluid may be introduced; said poppet being movably coupled to said valve seat and biased to normally engage said valve seat while being arranged to move off of said valve seat and into engagement with said impact cushion against said bias; said impact cushion being movably coupled to said valve body and biased, whereupon when said poppet moves into engagement with said impact cushion said impact cushion and said poppet stay together and said impact cushion moves with respect to said valve body to absorb energy from said poppet.

2. The check valve of claim 1 wherein said poppet is biased by a first spring.

3. The check valve of claim 1 wherein said impact cushion is biased by a second spring.

4. The check valve of claim 2 wherein said impact cushion is biased by a second spring.

5. The check valve of claim 1 wherein said impact cushion comprises a plastic material.

6. The check valve of claim 5 wherein said plastic material comprises glass filled polytetrafluoroethylene.

7. The check valve of claim 5 wherein the valve body comprises metal.

8. The check valve of claim 2 wherein said poppet is arranged to move away from said valve seat against the bias of said first spring when the fluid pressure at said port reaches a threshold value.

9. The check valve of claim 1 wherein said impact cushion provides slidable guidance for said poppet upon the movement of said poppet off of said valve seat.

10. The check valve of claim 2 wherein said impact cushion provides slidable guidance for said poppet upon the opening of said valve, said poppet including a first spring engaging member, said first spring being coupled between said first spring engaging member and a portion of said impact cushion.

11. The check valve of claim 10 wherein said first spring comprises a compression spring located within a bore within said impact cushion.

12. The check valve of claim 3 wherein said impact cushion comprises a second spring engaging member and wherein said second spring is coupled between said second spring engaging member and a portion of said valve body.

13. The check valve of claim 12 wherein said impact cushion comprises a stop surface and wherein said stop surface is arranged to engage said portion of another valve body against the bias of said second spring.

14. The check valve of claim 13 wherein said second spring comprises a compression spring located within a bore within said valve body.

15. The check valve of claim 10 wherein said impact cushion is biased by a second spring and wherein said impact cushion comprises a second spring engaging member, said second spring being coupled between said second spring engaging member and a portion of said valve body.

16. The check valve of claim 15 wherein said impact cushion comprises a stop surface and wherein said stop surface is arranged to engage said portion of another valve body against the bias of said second spring.

17. The check valve of claim 16 wherein said second spring comprises a compression spring located within a bore within said valve body.

* * * * *